United States Patent
Todd et al.

(10) Patent No.: US 12,549,391 B2
(45) Date of Patent: Feb. 10, 2026

(54) SUBSCRIPTION-BASED MODEL WITH PROTECTION AGAINST BILLING AVOIDANCE

(71) Applicant: Dell Products L.P., Round Rock, TX (US)

(72) Inventors: Stephen J. Todd, North Andover, MA (US); Trevor Scott Conn, Leander, TX (US); Ahmed Khalid, Cork (IE); Mustafa Al-Bado, Cork (IE)

(73) Assignee: Dell Products L.P., Round Rock, TX (US)

( * ) Notice: Subject to any disclaimer, the term of this patent is extended or adjusted under 35 U.S.C. 154(b) by 242 days.

(21) Appl. No.: 18/362,723

(22) Filed: Jul. 31, 2023

(65) Prior Publication Data

US 2025/0045809 A1    Feb. 6, 2025

(51) Int. Cl.
*H04L 9/00* (2022.01)
*G06Q 20/38* (2012.01)

(52) U.S. Cl.
CPC .............. *H04L 9/50* (2022.05); *G06Q 20/382* (2013.01)

(58) Field of Classification Search
CPC ................................ H04L 9/50; G06Q 20/382
See application file for complete search history.

(56) References Cited

U.S. PATENT DOCUMENTS

| | | | |
|---|---|---|---|
| 7,302,641 B1 | 11/2007 | Yajima | |
| 9,330,389 B2 | 5/2016 | Pitroda et al. | |
| 10,135,607 B1* | 11/2018 | Roets | H04L 9/3213 |
| 10,438,290 B1 | 10/2019 | Winklevoss et al. | |
| 10,581,805 B2 | 3/2020 | Simons et al. | |
| 10,601,665 B2 | 3/2020 | Bathen et al. | |
| 10,871,948 B1* | 12/2020 | Dowling | H04L 63/12 |
| 10,915,891 B1 | 2/2021 | Winklevoss et al. | |

(Continued)

FOREIGN PATENT DOCUMENTS

| | | |
|---|---|---|
| WO | 2018/126077 A1 | 7/2018 |
| WO | 2019/210409 A1 | 11/2019 |

(Continued)

OTHER PUBLICATIONS

Ahmed G. Gad et al. "Emerging Trends in Blockchain Technology and Applications: A Review and Outlook." (Oct. 2022). Retrieved online Apr. 2, 2025. https://www.sciencedirect.com/science/article/pii/S1319157822000891 (Year: 2022).

(Continued)

*Primary Examiner* — Jimmy H Tran
(74) *Attorney, Agent, or Firm* — Workman Nydegger

(57) ABSTRACT

One example method includes connecting a digital wallet of a customer to an agent of a data confidence fabric, receiving, from an application, a request for performance of a trust function, by the data confidence fabric, with respect to customer data, processing the customer data by applying the trust function to the customer data, returning the customer data, after the processing, to the agent, creating annotations for the customer data, based on the trust function that was applied, upon successful execution of a smart contract, transferring a fee from the digital wallet to a trust provider associated with the data confidence fabric, and providing the processed customer data to another entity.

18 Claims, 3 Drawing Sheets

(56) References Cited

U.S. PATENT DOCUMENTS

| | | | |
|---|---|---|---|
| 11,108,891 B1 | 8/2021 | Todd et al. | |
| 11,153,280 B1* | 10/2021 | Walwadkar | H04L 63/166 |
| 11,188,977 B2 | 11/2021 | Youb et al. | |
| 11,200,569 B1 | 12/2021 | James et al. | |
| 11,308,487 B1 | 4/2022 | Foster et al. | |
| 11,334,883 B1 | 5/2022 | Auerbach et al. | |
| 11,416,230 B2 | 8/2022 | Todd et al. | |
| 11,533,381 B1* | 12/2022 | Hockey | H04L 67/564 |
| 11,562,333 B1* | 1/2023 | James | H04L 9/3247 |
| 11,716,312 B1* | 8/2023 | McNamara, Jr. | G06F 21/46 |
| | | | 726/6 |
| 11,792,084 B1* | 10/2023 | Foukas | G06F 9/44526 |
| 11,961,070 B2 | 4/2024 | Sarin | |
| 11,971,862 B1 | 4/2024 | Han et al. | |
| 11,978,044 B2 | 5/2024 | Basu et al. | |
| 12,008,561 B2 | 6/2024 | Cona et al. | |
| 12,032,696 B2* | 7/2024 | Todd | G06F 16/1734 |
| 12,045,879 B2* | 7/2024 | Rapowitz | G06Q 40/03 |
| 12,118,613 B2* | 10/2024 | Foote | G06Q 20/3829 |
| 12,141,871 B1* | 11/2024 | James | G06Q 20/065 |
| 2009/0024660 A1 | 1/2009 | Borgsmidt et al. | |
| 2009/0028135 A1* | 1/2009 | Mantripragada | H04L 12/66 |
| | | | 370/352 |
| 2009/0144313 A1 | 6/2009 | Hodge et al. | |
| 2010/0082771 A1* | 4/2010 | Wood | G06F 15/16 |
| | | | 709/219 |
| 2010/0153835 A1 | 6/2010 | Xiong et al. | |
| 2011/0296510 A1* | 12/2011 | Hatlelid | H04L 63/08 |
| | | | 726/7 |
| 2015/0379510 A1* | 12/2015 | Smith | G06F 21/64 |
| | | | 705/71 |
| 2016/0117668 A1* | 4/2016 | Pitroda | G06Q 20/4014 |
| | | | 705/71 |
| 2017/0132620 A1 | 5/2017 | Miller et al. | |
| 2018/0101906 A1 | 4/2018 | Mcdonald et al. | |
| 2018/0218343 A1* | 8/2018 | Kolb | G06Q 20/102 |
| 2018/0276626 A1* | 9/2018 | Laiben | G06Q 20/3829 |
| 2018/0287800 A1* | 10/2018 | Chapman | H04L 9/3226 |
| 2018/0329693 A1* | 11/2018 | Eksten | G06F 8/65 |
| 2019/0019251 A1* | 1/2019 | Phillips, IV | G06Q 40/06 |
| 2019/0116158 A1* | 4/2019 | Patil | H04L 63/123 |
| 2019/0238316 A1* | 8/2019 | Padmanabhan | H04L 67/1095 |
| 2019/0260803 A1* | 8/2019 | Bykampadi | H04L 63/168 |
| 2019/0303942 A1* | 10/2019 | Balaraman | H04L 9/3239 |
| 2019/0333054 A1* | 10/2019 | Cona | H04L 9/3297 |
| 2019/0347406 A1* | 11/2019 | Lev-Ran | G06F 21/51 |
| 2019/0379642 A1* | 12/2019 | Simons | H04L 63/0281 |
| 2019/0385153 A1* | 12/2019 | Cui | G01F 15/063 |
| 2019/0385154 A1* | 12/2019 | Cui | G01F 15/063 |
| 2019/0386969 A1* | 12/2019 | Verzun | G06F 21/606 |
| 2020/0007312 A1* | 1/2020 | Vouk | H04L 9/3239 |
| 2020/0027089 A1* | 1/2020 | Kuchar | H04L 9/0637 |
| 2020/0104819 A1* | 4/2020 | Garcia | H04L 9/0894 |
| 2020/0112443 A1* | 4/2020 | Todd | H04L 9/3255 |
| 2020/0120023 A1* | 4/2020 | Munson | G06F 21/602 |
| 2020/0133955 A1* | 4/2020 | Padmanabhan | H04L 9/3218 |
| 2020/0236102 A1* | 7/2020 | Azulay | H04L 67/02 |
| 2020/0313856 A1* | 10/2020 | Basu | H04L 9/3073 |
| 2020/0344233 A1* | 10/2020 | Lai | G06Q 20/4014 |
| 2021/0027404 A1* | 1/2021 | de Bold | G06Q 50/18 |
| 2021/0082044 A1* | 3/2021 | Sliwka | H04L 9/3255 |
| 2021/0112117 A1* | 4/2021 | Munson | H04L 9/0643 |
| 2021/0124727 A1 | 4/2021 | Todd et al. | |
| 2021/0124728 A1 | 4/2021 | Todd et al. | |
| 2021/0126794 A1* | 4/2021 | Forrester | G06F 21/64 |
| 2021/0164794 A1* | 6/2021 | Nagpal | H04L 9/3231 |
| 2021/0192520 A1* | 6/2021 | Patel | G06Q 20/02 |
| 2021/0209684 A1* | 7/2021 | Foote | G06F 21/602 |
| 2021/0243167 A1* | 8/2021 | Todd | H04L 9/50 |
| 2021/0243218 A1* | 8/2021 | Todd | H04L 9/50 |
| 2021/0304065 A1 | 9/2021 | Todd et al. | |
| 2021/0328886 A1* | 10/2021 | Guim Bernat | H04L 41/5022 |
| 2021/0342803 A1* | 11/2021 | Yoo | G06Q 20/102 |
| 2021/0365445 A1* | 11/2021 | Robell | G06F 16/90 |
| 2021/0366586 A1* | 11/2021 | Ryan | G06Q 20/3224 |
| 2021/0374730 A1* | 12/2021 | Todd | G06Q 20/12 |
| 2021/0385216 A1* | 12/2021 | Khalil | H04L 9/50 |
| 2021/0405983 A1* | 12/2021 | Todd | G06F 21/64 |
| 2021/0409436 A1 | 12/2021 | Todd et al. | |
| 2022/0021711 A1* | 1/2022 | Marsh | H04L 9/3247 |
| 2022/0038289 A1* | 2/2022 | Huang | H04L 67/1076 |
| 2022/0084015 A1* | 3/2022 | Fawzy | G06Q 20/3672 |
| 2022/0100858 A1* | 3/2022 | Todd | G06F 21/57 |
| 2022/0100879 A1* | 3/2022 | Todd | G06F 16/2379 |
| 2022/0116445 A1* | 4/2022 | Filippou | H04L 41/0853 |
| 2022/0129555 A1* | 4/2022 | Todd | G06F 16/24568 |
| 2022/0138325 A1* | 5/2022 | Todd | G06F 21/64 |
| | | | 726/26 |
| 2022/0188800 A1 | 6/2022 | Sells et al. | |
| 2022/0210061 A1* | 6/2022 | Simu | H04L 9/3239 |
| 2022/0253842 A1 | 8/2022 | James et al. | |
| 2022/0261882 A1 | 8/2022 | Youb et al. | |
| 2022/0272127 A1* | 8/2022 | Yawalkar | H04L 63/1433 |
| 2022/0294690 A1* | 9/2022 | Nolan | H04W 4/08 |
| 2022/0327529 A1 | 10/2022 | Williams et al. | |
| 2022/0351232 A1* | 11/2022 | Chan | G06Q 30/0215 |
| 2023/0114684 A1* | 4/2023 | Jakobsson | H04L 9/3213 |
| | | | 713/159 |
| 2023/0155984 A1* | 5/2023 | Adam | H04L 63/0281 |
| | | | 726/26 |
| 2023/0173395 A1* | 6/2023 | Cella | G06Q 30/06 |
| | | | 463/25 |
| 2023/0196318 A1 | 6/2023 | Rosen et al. | |
| 2023/0230091 A1* | 7/2023 | Vaughn | G06Q 20/4016 |
| | | | 705/71 |
| 2023/0237403 A1* | 7/2023 | Reineke | G06Q 10/06393 |
| | | | 706/46 |
| 2023/0237499 A1 | 7/2023 | Padmanabhan | |
| 2023/0334492 A1 | 10/2023 | Tai et al. | |
| 2023/0351393 A1* | 11/2023 | Cella | G06Q 30/0206 |
| 2023/0362015 A1 | 11/2023 | Kayaba et al. | |
| 2024/0046318 A1* | 2/2024 | Muriqi | G06Q 20/389 |
| 2024/0106839 A1* | 3/2024 | Smith | H04L 63/1441 |
| 2024/0152889 A1 | 5/2024 | Todd et al. | |
| 2024/0152911 A1* | 5/2024 | Rezaiean-Asel | G06Q 20/02 |
| 2024/0249277 A1* | 7/2024 | Hwang | G06Q 20/02 |
| 2024/0256691 A1* | 8/2024 | Hwang | G06Q 20/389 |
| 2024/0281799 A1* | 8/2024 | Ryan | G06Q 20/3678 |
| 2024/0289776 A1* | 8/2024 | Bimolaksono | G06Q 20/381 |
| 2024/0354735 A1* | 10/2024 | Kell | G06Q 20/38215 |
| 2024/0354747 A1* | 10/2024 | Belostock | G06Q 20/065 |
| 2024/0364521 A1* | 10/2024 | Tang | H04L 9/3213 |
| 2025/0088376 A1* | 3/2025 | Ren | H04L 9/3239 |

FOREIGN PATENT DOCUMENTS

| | | |
|---|---|---|
| WO | 2020/124317 A1 | 6/2020 |
| WO | 2021/173716 A1 | 9/2021 |

OTHER PUBLICATIONS

Choudhury et al. "Impact of Distributed Ledger Technology in Global Capital Markets." (May 16, 2023) Retrieved online Apr. 2, 2025. https://www.gfma.org/wp-content/uploads/2023/05/impact-of-dlt-on-global-capital-markets-full-report.pdf (Year: 2023).

John Kolb. "A Languge-Based Approach to Smart Contract Engineering." (Dec. 18, 2020). Retrieved online Apr. 2, 2025. https://www2.eecs.berkeley.edu/Pubs/TechRpts/2020/EECS-2020-220.pdf (Year: 2020).

Murphy et al, Towards trust-based data weighting in machine learning, 2023 IEEE 31st International Conference on Network Protocols (ICNP), pp. 1-6 (Oct. 2023) (Year: 2023).

* cited by examiner

SUBSCRIPTION-BASED MODEL WITH PROTECTION AGAINST BILLING AVOIDANCE

FIELD OF THE INVENTION

Embodiments of the present invention generally relate to data confidence fabrics. More particularly, at least some embodiments of the invention relate to systems, hardware, software, computer-readable media, and methods, for preventing avoidance of payment mechanisms employed in connection with the provision of data confidence services and functions.

BACKGROUND

In the context of a data confidence fabric, an application or consumer may have additional usages for modules and functionalities provided by a data confidence service provider, that is, usages not provided by or pertaining to the data confidence services. Thus, a user may avoid usage charges assessed by the data confidence service provider by buying the hardware or modules from another provider at a lower cost and then using the hardware and modules for other purposes, thereby avoiding payment mechanisms implemented by the data confidence service provider.

This circumstance in data confidence fabrics and associated services is comparable to problems in business models where opting-out, and pursuing a less expensive option, is relatively easy for consumers. The razor and blades business model is illustrative. A consumer can purchase the razor from the manufacturer, but may be able to purchase the replacement blades less expensively from a third party provider, and thereby avoid the additional expense that would be incurred if the replacement blades were purchased from the manufacturer. As another example, printer manufacturers that use this model, that is, selling printers at a relatively low price and compensating by realizing a profit on the replacement ink cartridges, are susceptible to consumers who buy ink cartridges from third-party vendors, thereby avoiding the more expensive ink cartridges offered by the manufacturer.

Thus, there is a need in the data confidence fabric context, at least, to ensure that consumers of data confidence services, hardware, and functionality, cannot bypass the payment mechanisms put in place by the data confidence service and equipment providers.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
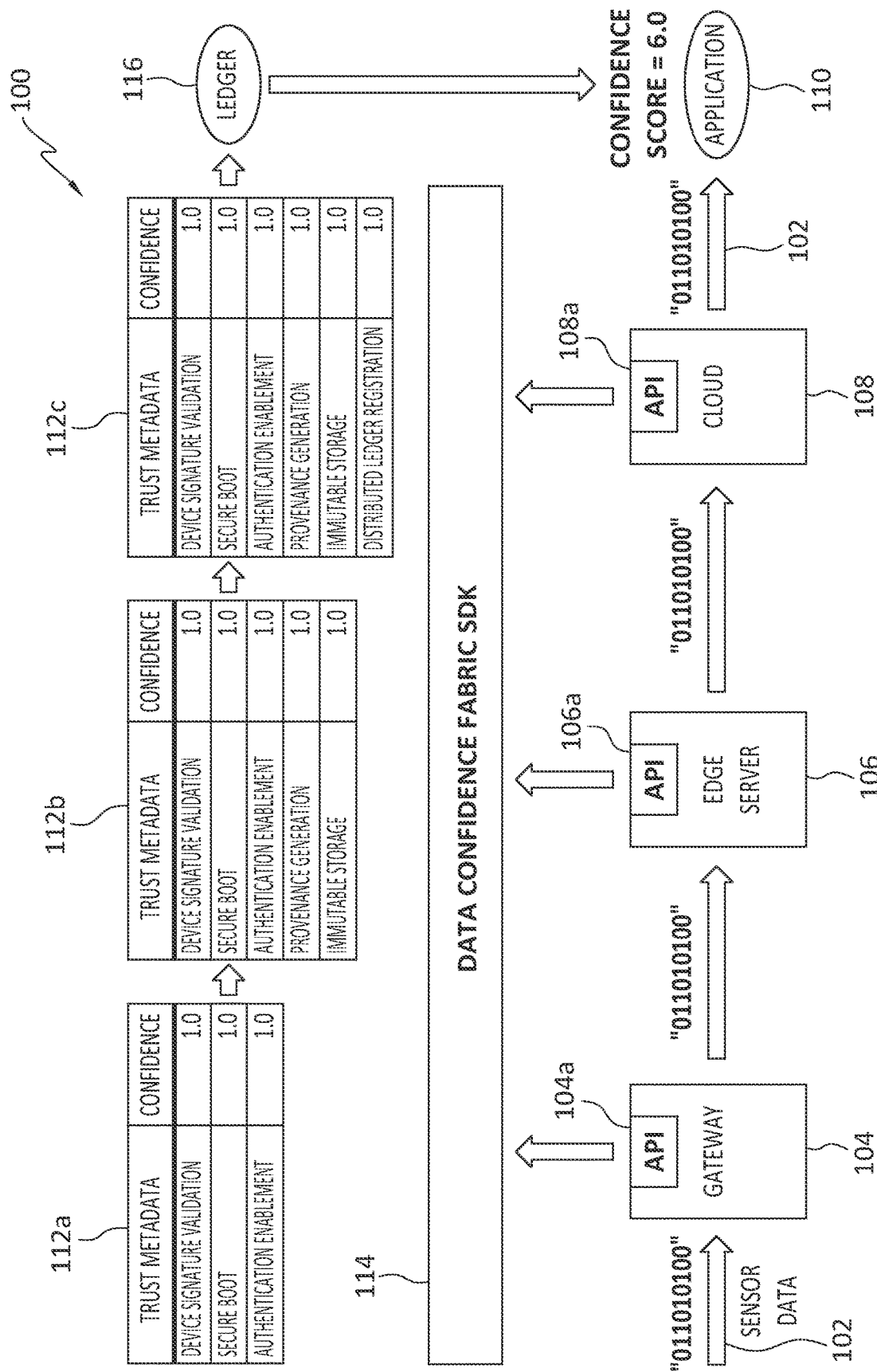
FIG. 1 discloses aspects of a data confidence fabric according to one example embodiment.

Embodiments of the present invention generally relate to data confidence fabrics. More particularly, at least some embodiments of the invention relate to systems, hardware, software, computer-readable media, and methods, for preventing avoidance of payment mechanisms employed in connection with the provision of data confidence services and functions.

In one example embodiment, which may be implemented in a DCF (data confidence fabric), a prospective consumer of DCF services may use a trust module of the DCF, such as a TPM (trusted platform module) chip or secure enclave for example, as a mechanism to join the DCF and build trust in the consumer data. The customer may have two types of applications that request the use an application of trust functions provided by the DCF, namely, a first type of application that requests publication of annotations and trust metadata to a DCF ledger, and a second type of application that requests the application of trust functions to its data for other purposes, that is, purposes other than the publication of trust information to the DCF ledger for use in connection with DCF operations. In an embodiment, the application can inform an agent of the DCF whether or not the application intends to use the DCF ledger. Depending on whether or not the DCF ledger is used by the user application, the user may be charged differently, such as by way of smart contracts for example.

In more detail, the request from the application for the application of DCF trust services may be fulfilled, and the processed data sent back to the agent of the DCF. The fee for processing of the data may then be assessed to the consumer based on the type of application that made the request. Thus, a request for the application of trust functions for purposes other than creation and publication of the trust information in the DCF ledger may be billed differently, possibly higher, than a request for creation and publication of trust information to the DCF ledger. In an embodiment, the agent may have access to a consumer wallet so that, regardless of whether the services provided to the consumer involve publication of trust information to the DCF ledger, or not, the payment terms of a smart contract agreed to by the consumer may ensure that consumer payment is made to the DCF services provider. The consumer wallet may sometimes be referred to herein as a digital wallet, a user wallet, or a cryptocurrency wallet. Per the payment terms, only after payment is made by the consumer is the processed data returned to the consumer. In this way, the consumer is prevented from bypassing the payment mechanism when using DCF trust services for purposes other than the publication of trust information to the DCF ledger. Thus, embodiments of the invention may be integrated into, and interoperate with, a DCF and its associated functions and operations.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that a consumer of trust services may be prevented from bypassing a computer-implemented payment mechanism of a DCF, even when the trust services pertain to usages that may be outside the scope of DCF, or trust provider, services. An embodiment of the invention may operate to prevent access to certain services for unauthorized use and/or prevent access to those services by an unauthorized party. An embodiment may provide for the expansion, and improvement, of the functionality of a DCF. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

Moreover, an embodiment may comprise, or consist of, operations that are performed only by various types of computing entities, and are not performed by any human(s). That is, unless an embodiment explicitly identifies a human as performing one or more operations of that embodiment, such operations should be understood to be computer-implemented.

A. Aspects of an Example Architecture and Environment

The following is a discussion of aspects of example operating environments for various embodiments of the invention. This discussion is not intended to limit the scope of the invention, or the applicability of the embodiments, in any way. In general, embodiments of the invention may be implemented in connection with systems, software, and components, that individually and/or collectively implement, and/or cause the implementation of, a data confidence fabric (DCF).

With reference now to FIG. 1, embodiments of the invention may be implemented in a variety of operating environments, one example of which is a DCF, denoted at 100 in FIG. 1. In general, the DCF 100 may annotate and score any data that flows within it, providing increased confidence to the applications that use that data, such as for analytical purposes for example.

As shown in FIG. 1, the example DCF 100 concerns the context of edge-based use cases, but the scope of the invention is not limited to such cases or contexts. As shown in the example of FIG. 1, data such as sensor data 102 generated by a sensor flows through one or more tiers, or layers, of the DCF. In the illustrated example, the data 102 may flow through nodes such as a gateway 104, edge server 106, and cloud ecosystem 108, and may ultimately be consumed by one or more applications 110. As trusted handling of the data 102, at the nodes of the various layers, occurs during data 102 delivery, respective trust metadata 112a, 112b, and 112c may be associated with the data 102 by those nodes, that is, by the gateway 104, edge server 106, and/or, cloud ecosystem 108. Thus, trust metadata may continue to accumulate as the data 102 passes through the various nodes in its path.

The trust metadata 112a, 112b, and 112c, may comprise, for example, respective confidence scores associated with trust insertion processes performed by the nodes with respect to the data 102. The trust metadata 112a, 112b, and 112c may be associated with the data 102 by respective node APIs (Application Program Interfaces) 104a, 106a, and 108a that communicate with an interface 114 such as an Alvarium SDK (Software Development Kit). After the data 102 has transited the various nodes, the final, comprehensive trust metadata 112c may be entered into a ledger 116 which may make the trust metadata 112c available for use by the applications 110. Note that, in this example, the trust metadata 112c is an accumulation of all the trust metadata respectively added by the gateway 104, edge server 106, and cloud ecosystem 108.

To illustrate with reference to the specific example of FIG. 1, the gateway 104 may annotate, to the data 102, respective trust metadata 112a for each of three different operations. Particularly, the gateway 104 may annotate trust metadata 112a that indicates, among other things: the gateway 104 has successfully validated the signature coming from the device that generated the data 102; the gateway 104 has used a TPM chip to confirm that the BIOS, firmware, or O/S on the gateway 104 was tampered with during boot; and, the gateway 104 is currently running authentication/authorization software to protect the data 102 stream from unwanted inspection or access. With continued reference to the trust metadata, including the trust metadata 112a, a Confidence score of "1.0" means that a trust insertion process, such as the secure boot confirmation for example, operation succeeded, while a score of "0," for example, might indicate that signature validation failed, or was not performed for some reason.

As noted earlier, the DCF metadata, that is, the trust metadata 112a, ultimately arrives at the ledger 116, where a ledger entry may be created that permanently records the contents of the trust metadata 112a table as well as an overall Confidence Score, which is 6.0 in this illustrative example. Note that the equation used to calculate the Confidence Score in the example of FIG. 1 is simply a summation of confidence scores, but other approaches to calculating an overall Confidence Score may alternatively be employed.

A useful aspect of the example DCF 100 is that, as a result of the annotation of trust metadata 112a, 112b, and 112c, the application 110 may have access to additional context about the trustworthiness of the data 102, addressing the problem of potentially untrustworthy or malicious data sources. The problems presented by such data sources are increasingly faced by enterprise customers as they move their business logic closer to non-enterprise, and potentially untrustworthy, data sources at the edge and/or elsewhere. In the example DCF 100, the path of the data 102 may be largely software-dependent, in the sense that data path handling software, which may comprise a respective instance at each of the gateway 104, edge server 106, and cloud ecosystem 108, may call an annotation/scoring API 104*a*, 106*a*, and 108*a*, respectively, and routing software may be provided at these nodes that forwards the annotations along the data path.

It is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing. Example embodiments of the invention may be applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

B. Context for an Embodiment

One example embodiment comprises the construction and use of a subscription-based business model that may be used to sell data services, hardware components and trust modules, such as a TPM chip or secure enclave for example, at relatively low cost and charging consumers in correspondence with their consumption/usage of such components and services. Some billing mechanisms for DCF are subscription-based by design, as these approaches only charge the consumers when the trust metadata, provided by the trust provider, is being written to the distributed ledger of the DCF. This approach may be sufficient to enforce contracts and charge consumers or applications that solely use trust modules for joining a confidence fabric and building trust in their data through the DCF. In certain circumstances however, an application or consumer that may have other usages for trust modules, that is, besides the services provided by Alvarium/DCF, may be able to avoid the usage charges by buying the hardware or modules at a lower cost, rather than from the trust provider, and then using the hardware, and possibly the trust information generated by the DCF, for other purposes that do not involve the Alvarium SDK, or other agent, and hence avoid the payment mechanisms of the DCF. Thus, an example embodiment may comprise methods and/or mechanisms to prevent a consumer from bypassing a DCF payment system.

C. Overview of an Example Embodiment

For the purposes of illustration, reference is made briefly to the example of a printer and cartridges model. A key aspect of this model is proprietary lock-in. For example, manufactures may design printers in a way that only their ink cartridges are compatible with the printer. By protecting the design of the proprietary cartridge, the manufacturer can, in effect, force the consumer of the printer to purchase only the proprietary cartridges. Put another way, this approach may enable the manufacturer to effectively prevent a consumer from purchasing and using third party cartridges.

By analogy with the printer example, an embodiment of the invention may employ computing systems and processes to require, or permit, one type of action, while preventing another type of action. Particularly, in order to implement a subscription-based model for hardware components and trust modules, such as may be deployed in a DCF for example, the access logic for accessing those components, and/or DCF services, may be embedded into the components, such that they can only be accessed through an authorized agent, which may be guaranteed to apply payment, and/or other, functions based on pre-agreed contracts or arrangements between entities, such as between consumers and trust providers. In an embodiment, both consumers and trust providers may comprise, or consist of, computing systems and associated operations.

Figure 3:
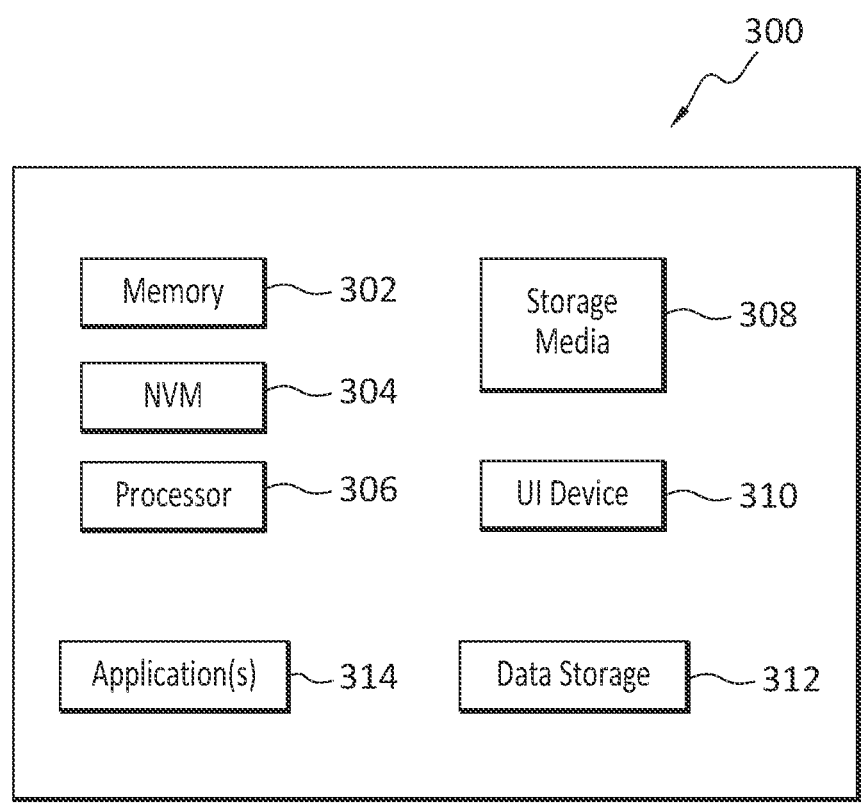
FIG. 3 discloses an example computing entity configured and operable to perform any of the disclosed methods, processes, and operations.

Due to its comprehensive design, Alvarium, for example, may be well suited to act as this authorized agent and may be upgraded with features required to ensure bill payments, and/or other actions, in conjunction with mechanisms such as are disclosed in Appendix A hereto. Appendix A forms a part of this disclosure and is incorporated herein in its entirety by this reference. FIG. 3, for example, of Appendix A is an example of a payment mechanism that may be integrated with an embodiment of the invention. No embodiment of the invention is required to use, or interact with, such a payment mechanism however.

D. Example Architecture and Methods

Figure 2:
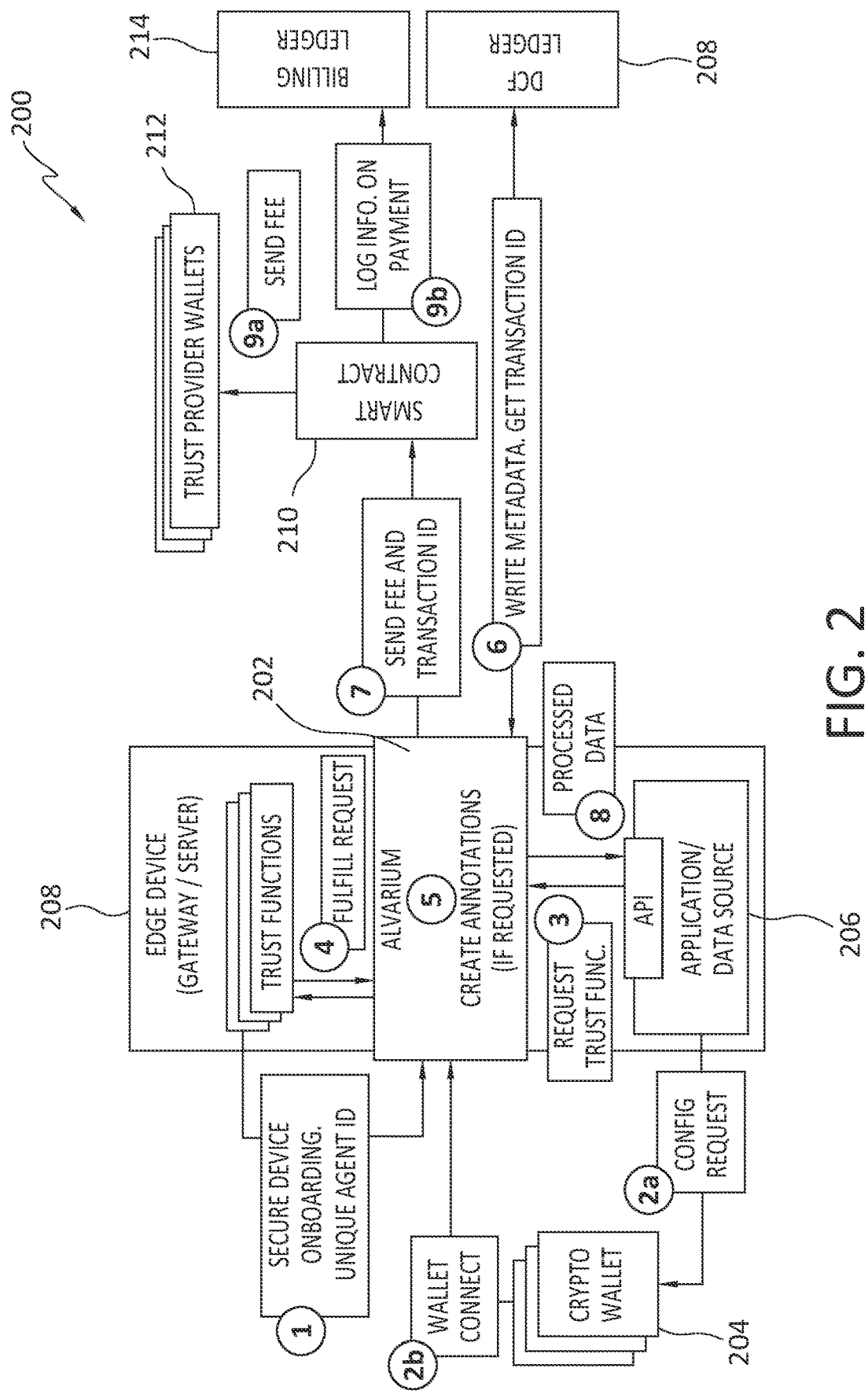
FIG. 2 discloses aspects of an architecture and related methods and operations according to one example embodiment.

With attention now to FIG. 2, an example architecture according to one embodiment is denoted generally at 200. In general, FIG. 2 discloses an approach for ensuring actions, such as customer payments for example, by using an Alvarium agent to control access to trust services such as may be provided by a DCF of a trust provider. An example of a DCF is disclosed in FIG. 1. Reference to FIG. 2 is made using the numbering disclosed there.

Initially, the trust provider components, that is, components provided by and/or made accessible by a trust provider operating a DCF, may be onboarded [1] using standard DCF security mechanisms, which may use or reference a unique Agent ID to perform the onboarding [1]. As part of the onboarding [1], those components may be attached to, or otherwise associated with, a verified agent. In an embodiment, the agent may comprise the Alvarium SDK 202, or a portion of the Alvarium SDK 202, such as an Alvarium agent for example. The Alvarium SDK 202 may be referred to herein simply as 'Alvarium.'

In an embodiment, the agent may be integrated directly into trust modules, such as a TPM module, for tighter coupling. However, Alvarium 202 may alternatively comprise an external agent, that is, an agent not directly integrated into a trust module, which may enable a more flexible and lightweight implementation in which multiple modules and components can be onboarded through the same agent.

Before a user application or data source can use trust functions, data services, or other functionality provided by the DCF of a trust provider, those applications and data sources may be required to connect [2b] a user wallet 204, such as a cryptocurrency wallet for example, to the agent 202. In an embodiment, the connection [2] may be implemented by sending, by Alvarium 202, a configuration request [2a] to the connection application of the user wallet 204. In an embodiment, multiple user wallets 204 may be connected to Alvarium 202 using secure connection mechanisms, examples of which are disclosed in Appendix A hereto.

In an embodiment, a user may have two types of applications 206 that request [3], such as by way of an API (application program interface), trust functions. One type of application is an application that wishes to publish annotations and trust metadata to a DCF ledger, an example of which is disclosed in FIG. 1. Alvarium 202 may define a "publish" function for such usages. Another type of application 206 is an application that wishes to apply trust functions to its data for other purposes. An additional parameter or a separate function is proposed for this usage, so the application 206 can inform Alvarium 202 whether that application intends to use the DCF ledger. Both of these operations, that is, the operations respectively requested [3] by the two types of applications 206, may be charged differently through the use of smart contracts, examples of which are discussed below.

Next, the request for a trust function issued by an application 206, such as an application running at an edge device, gateway, server, and/or other node or data source 208 of the DCF, may be fulfilled [4], and data processed using the trust function may be sent back to Alvarium 202. In general, the processing of application data using a trust function may include, but is not limited to, creating annotations and trust metadata, and associating the annotations and trust metadata with the application data.

Note that if the request [3] is passed to one or more trust modules (not shown) by any application other than by Alvarium 202, that is, Alvarium 202 is bypassed by the request [3], the request [3] may be denied by the trust modules and reported back to Alvarium 202. Additional actions may then be applied to the ID of the requesting application 206 or consumer. Such actions may include, for example, notifying auditing and regulatory entities if the device is online or disabling trust components if the device is offline.

With continued attention to the example of FIG. 2, Alvarium 202 may create [5] annotations for the data, based on the applied trust functions. In an embodiment, [5] may be performed only when the "publish" function is invoked at [3]. Next, the trust metadata and annotations may be written [6] on the distributed ledger 208 of the DCF. In an embodiment, [6] may be performed only when the "publish" function is invoked at [3].

Next, the fee for the service carried out by the trust provider, such as the data annotations, may be transferred [7], along with a unique transaction ID and any associated metadata, to a smart contract 210. On successful execution of the smart contract 210 function and payment, the processed data may then be sent back [8] to the application 206 and may be used by the application 206 as needed.

In general, the smart contract 210 may define payment terms relating to access and use of the processed data by the application 206. In one example embodiment, and based on a payment method defined in the smart contract 210, the fee, that is, the user payment, may be transferred [9a] to the wallet 212 of the trust provider. Finally, the fee transfer details may be logged into an immutable billing ledger 214 for auditing, and/or other, purposes.

It is noted that the method disclosed in FIG. 2 is one example of an approach for the implementation and use of a payment mechanism. Aspects of an embodiment may also be integrated with other mechanisms that are based on smart contracts. For example, pre-paid options, third-party proxy wallet options, and bulk payments, may also be deployed using smart contracts.

E. Further Discussion

As disclosed herein, implementation of a method for building a subscription-based model, or razor-and-blades business model, for hardware components and trust modules, may be challenging due to the lack of reliable mechanisms with strong guarantees for usage tracking and granular or flexible billing.

Thus, one embodiment may utilize smart contracts to ensure that payment, and other, terms are enforced in a decentralized manner without the need for an external authority. The automated payment and logging features of one example embodiment may enable granular and flexible micro-billing. The structure of Alvarium, for example, may provide a framework that may be used to manage access to trust modules and functions. Thus, an embodiment may employ Alvarium as an authorized agent that may act as the sole entity allowed to access trust modules on behalf of applications. In an embodiment, this agent may connect to a smart-contract-based payment mechanism, an example of which is disclosed herein, and may ensure that each usage of the trust functions is billed according to the pre-agreed terms and contracts, such as a smart contract for example, between/among the parties. As well, an example embodiment may enable any unauthorized access, or attempted access, to be denied, reported, and handled through the policies and regulations of a trust provider.

F. Example Use Case

Following are aspects of one example use case for an embodiment of the invention. This example use case is not intended to limit the scope of the invention in any way and is provided for the purposes of illustration.

An embodiment of the invention may enable trust providers, such as owners/operators of DCFs, to apply subscription-based models to their hardware components and trust modules. For example, using this model, an entity such as a trust provider may sell edge hardware to a consumer or user at a very low and affordable cost. Further, the entity may create, and execute, flexible smart contracts based on its business strategies, and tailored to the needs and requirements of consumers. In this example, the entity may execute these contracts with consumers using a process that may largely be automated. The consumers may then be charged, such as for trust services, according to the usage of the trust services and other terms spelled out in the smart contract. This charging may be performed automatically, efficiently and cost effectively. Finally, in this example use case, a system may track the usage, handle unauthorized usage attempts, and carry out audits. These operations may also be automated and handled remotely.

G. Example Methods

It is noted with respect to the disclosed methods, including the example methods of FIGS. 1 and 2, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

H. Further Example Embodiments

Following are some further example embodiments of the invention. These are presented only by way of example and are not intended to limit the scope of the invention in any way.

Embodiment 1. A method, comprising: connecting a digital wallet of a customer to an agent of a data confidence fabric; receiving, from an application, a request for performance of a trust function, by the data confidence fabric, with respect to customer data; processing the customer data by applying the trust function to the customer data; returning the customer data, after the processing, to the agent; creating annotations for the customer data, based on the trust function that was applied; upon successful execution of a smart contract, transferring a fee from the digital wallet to a trust provider associated with the data confidence fabric; and providing the processed customer data to a recipient.

Embodiment 2. The method as recited in any preceding embodiment, wherein processing the data using the trust function comprises creating trust metadata concerning the data as the data passes through the data confidence fabric.

Embodiment 3. The method as recited in any preceding embodiment, wherein processing the data using the trust function comprises creating trust metadata concerning the data, and writing the trust metadata to an immutable ledger of the data confidence fabric.

Embodiment 4. The method as recited in any preceding embodiment, wherein the fee is provided to the smart contract before being transferred to the trust provider.

Embodiment 5. The method as recited in any preceding embodiment, wherein an amount of the fee depends upon whether or not the processing of the data using the trust function includes writing information, generated by application of the trust function, to an immutable ledger of the data confidence fabric.

Embodiment 6. The method as recited in any preceding embodiment, wherein when the request is received from the application after having bypassed the agent, the request is denied.

Embodiment 7. The method as recited in any preceding embodiment, wherein the agent controls customer access to a trust module that operates as a mechanism to enable the application to join the data confidence fabric.

Embodiment 8. The method as recited in any preceding embodiment, wherein processing the data using the trust function comprises creating, in response to invocation of a 'publish' function, trust metadata concerning the data.

Embodiment 9. The method as recited in any preceding embodiment, wherein the agent is an element of a software development kit.

Embodiment 10. The method as recited in any preceding embodiment, wherein the processing of the data using the trust function is not performed until after the digital wallet is connected to the agent.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

I. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

With reference briefly now to FIG. 3, any one or more of the entities disclosed, or implied, by FIGS. 1-2, and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   connecting a digital wallet of a customer to an agent of a data confidence fabric;
   receiving, from an application, a request for performance of a trust function, by the data confidence fabric, with respect to customer data, and when another request is received from the application after having bypassed the agent, the another request is denied;
   processing the customer data by applying the trust function to the customer data;
   returning the customer data, after the processing, to the agent;
   creating annotations for the customer data, based on the trust function that was applied;
   upon successful execution of a smart contract, transferring a fee from the digital wallet to a trust provider associated with the data confidence fabric; and
   providing the processed customer data to a recipient.

2. The method as recited in claim 1, wherein processing the data using the trust function comprises creating trust metadata concerning the data as the data passes through the data confidence fabric.

3. The method as recited in claim 1, wherein processing the data using the trust function comprises creating trust metadata concerning the data, and writing the trust metadata to an immutable ledger of the data confidence fabric.

4. The method as recited in claim 1, wherein the fee is provided to the smart contract before being transferred to the trust provider.

5. The method as recited in claim 1, wherein an amount of the fee depends upon whether or not the processing of the data using the trust function includes writing information, generated by application of the trust function, to an immutable ledger of the data confidence fabric.

6. The method as recited in claim 1, wherein the agent controls customer access to a trust module that operates as a mechanism to enable the application to join the data confidence fabric.

7. The method as recited in claim 1, wherein processing the data using the trust function comprises creating, in response to invocation of a 'publish' function, trust metadata concerning the data.

8. The method as recited in claim 1, wherein the agent is an element of a software development kit.

9. The method as recited in claim 1, wherein the processing of the data using the trust function is not performed until after the digital wallet is connected to the agent.

10. A non-transitory storage medium having stored therein instructions that are executable by one or more hardware processors to perform operations comprising:
    connecting a digital wallet of a customer to an agent of a data confidence fabric;
    receiving, from an application, a request for performance of a trust function, by the data confidence fabric, with respect to customer data, and when another request is received from the application after having bypassed the agent, the another request is denied;
    processing the customer data by applying the trust function to the customer data;
    returning the customer data, after the processing, to the agent;
    creating annotations for the customer data, based on the trust function that was applied;
    upon successful execution of a smart contract, transferring a fee from the digital wallet to a trust provider associated with the data confidence fabric; and
    providing the processed customer data to a recipient.

11. The non-transitory storage medium as recited in claim 10, wherein processing the data using the trust function comprises creating trust metadata concerning the data as the data passes through the data confidence fabric.

12. The non-transitory storage medium as recited in claim 10, wherein processing the data using the trust function comprises creating trust metadata concerning the data, and writing the trust metadata to an immutable ledger of the data confidence fabric.

13. The non-transitory storage medium as recited in claim 10, wherein the fee is provided to the smart contract before being transferred to the trust provider.

14. The non-transitory storage medium as recited in claim 10, wherein an amount of the fee depends upon whether or not the processing of the data using the trust function includes writing information, generated by application of the trust function, to an immutable ledger of the data confidence fabric.

15. The non-transitory storage medium as recited in claim 10, wherein the agent controls customer access to a trust module that operates as a mechanism to enable the application to join the data confidence fabric.

16. The non-transitory storage medium as recited in claim 10, wherein processing the data using the trust function comprises creating, in response to invocation of a 'publish' function, trust metadata concerning the data.

17. The non-transitory storage medium as recited in claim 10, wherein the agent is an element of a software development kit.

18. The non-transitory storage medium as recited in claim 10, wherein the processing of the data using the trust function is not performed until after the digital wallet is connected to the agent.

* * * * *